US012589863B1

(12) United States Patent
    Loftus

(10) Patent No.: US 12,589,863 B1
(45) Date of Patent: Mar. 31, 2026

(54) SOUND-REDUCING ROTOR BLADE TRACKING WEDGE PROFILE

(71) Applicant: HAYMATT, L.L.C., Phoenix, AZ (US)

(72) Inventor: Robert T. Loftus, Gilbert, AZ (US)

(73) Assignee: HAYMATT, L.L.C., Phoenix, AZ (US)

( * ) Notice: Subject to any disclaimer, the term of this patent is extended or adjusted under 35 U.S.C. 154(b) by 0 days.

(21) Appl. No.: 18/737,892

(22) Filed: Jun. 7, 2024

Related U.S. Application Data

(63) Continuation-in-part of application No. 17/369,238, filed on Jul. 7, 2021, now Pat. No. 12,006,026.

(51) Int. Cl.
    B64C 27/00 (2006.01)
    B64C 27/467 (2006.01)

(52) U.S. Cl.
    CPC .......... B64C 27/008 (2013.01); B64C 27/001 (2013.01); B64C 27/467 (2013.01)

(58) Field of Classification Search
    None
    See application file for complete search history.

(56) References Cited

U.S. PATENT DOCUMENTS

| | | | |
|---|---|---|---|
| RE19,412 E | 1/1935 | Zaparka | |
| 3,952,601 A | 4/1976 | Galli et al. | |
| 3,999,888 A | 12/1976 | Zincone | |
| 4,601,639 A | 7/1986 | Yen et al. | |
| 4,618,313 A | 10/1986 | Mosiewicz | |
| 5,088,665 A | 2/1992 | Vijgen et al. | |
| 5,492,448 A * | 2/1996 | Perry ........................ | B64C 3/14 |
| | | | 416/243 |
| 7,118,343 B2 | 10/2006 | Loftus et al. | |
| 8,192,162 B2 | 6/2012 | Loftus et al. | |
| 11,761,418 B2 * | 9/2023 | Gaudern ............. | F03D 1/06495 |
| | | | 416/223 R |
| 12,006,026 B2 | 6/2024 | Loftus | |
| 2010/0028151 A1 | 2/2010 | Loftus et al. | |
| 2015/0292522 A1 | 10/2015 | Singh et al. | |
| 2016/0052627 A1 | 2/2016 | Piechowicz | |
| 2023/0374969 A1 * | 11/2023 | Gaudern ............... | F03D 1/0645 |

OTHER PUBLICATIONS

Vasishta Bhargava et al., "A Review of Trailing Edge Bluntness and Tip Noise from Wind Turbine Blades", IOSR Journal of Applied Physics, e-ISSN: 2278-4861, vol. 9, Issue 4 Ver. IV (Jul.-Aug. 2017), pp. 20-31.
Valentin Butoescu, "A Vortex Model of a Helicopter Rotor", INCAS—Bulletin No. 1/2009, Dept of Aerodynamics, "Elie Carafoli" National Institute for Aerospace Research—INCAS 061126, Bucharest, Romania, pp. 23-27.

(Continued)

*Primary Examiner* — Juan G Flores

(74) *Attorney, Agent, or Firm* — Bycer & Marion, PLC; Matthew L. Bycer

(57) ABSTRACT

This invention provides a profile attachment to provide convenient airframe vibration, tracking, and acoustic improvements of a helicopter rotor blade. The profile system is designed to minimize acoustic disturbances as air passes the airfoil. The profile may be attached through an adhesive system that is permanent or that allows convenient removal and relocation for use by the helicopter manufacturer or by the helicopter operator in a field environment.

20 Claims, 8 Drawing Sheets

(56) References Cited

OTHER PUBLICATIONS

Edvard Schroeder et al., "Aerofoil Trailing Edge Self-Noise Reduction by Surface Mounted Attenuation Devices", Proceedings of the 23rd International Congress on Acoustics, Aachen, Germany, Sep. 9-13, 2019, pp. 5327-5334.

J. Nedic and J.C. Vassilicos, "Vortex Shedding and Aerodynamic Performance of an Airfoil with Multi-scale Trailing Edge Modifications", American Institute of Aeronautics and Astronautics, Imperial College London, pp. 1-24.

Nikitas Thomareis and George Papadakis, "Effect of Trailing Edge Shape on the Separated Flow Characteristics Around an Airfoil at low Reynolds Number: A Numerical Study", Physics of Fluids 29, (published online Jan. 17, 2017 by the American Institute of Physics), pp. 014101-1 to 014101-17.

Z. Zuo et al., "An Analysis on the Flow Field Structures and the Aerodynamic Noise of Airfoils with Serrated Trailing Edges Based on Embedded Large Eddy Flow Simulations", Journal of Applied Fluid Mechanics (JAFM), vol. 12, No. 2, pp. 327-339 (2019).

Michael J. Collison et al., "Vortex Shedding Noise Reduction of a Mixed Flow Fan: Experimental and Numerical Investigation", FAN 2015 Conference Paper (France), Apr. 15-17, 2015), pp. 1-11.

E.L. Houghton et al., "Camber Line—an overview", ScienceDirect Topics (Jun. 4, 2021), pp. 1-21.

* cited by examiner

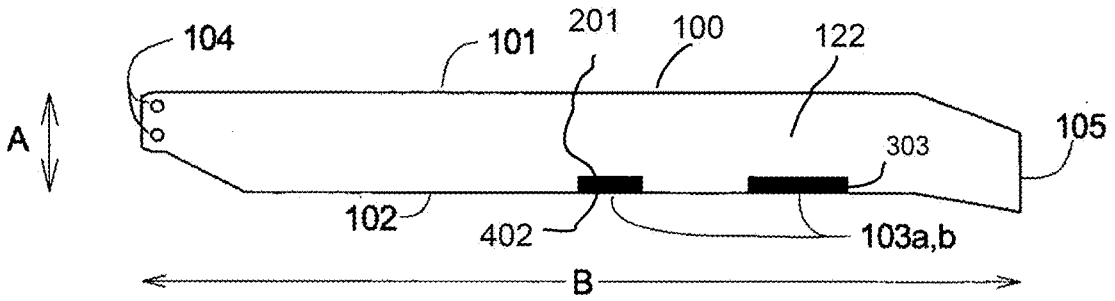
Fig. 1A
PRIOR ART
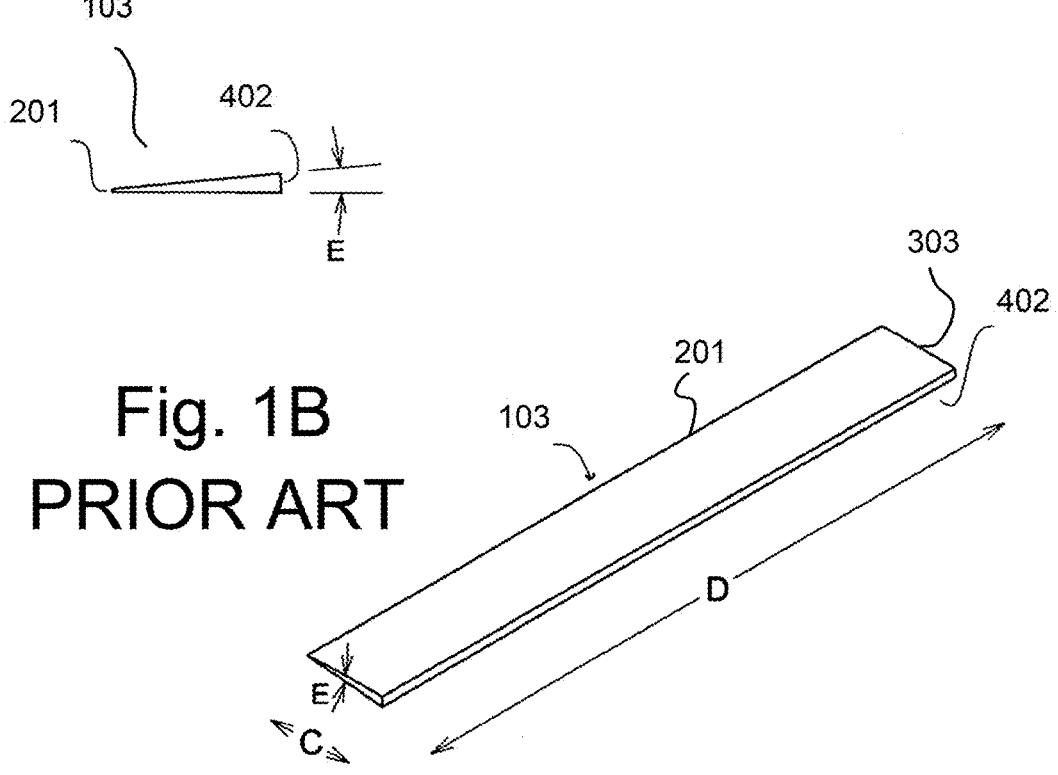
Fig. 1B
PRIOR ART
Fig. 1C
PRIOR ART Blade Airfoil
Cross
Section Standard
Wedge
Installation

SOUND-REDUCING ROTOR BLADE TRACKING WEDGE PROFILE

CLAIM OF PRIORITY

The present continuation-in-part application includes subject matter disclosed in and claims priority to U.S. patent application Ser. No. 17/369,238, filed Jul. 7, 2021 (now U.S. Pat. No. 12,006,026, issued Jun. 11, 2024) entitled "Sound-Reducing Rotor Blade Tracking Wedge Profile", which claims priority to a provisional application entitled "Sound-Reducing Rotor Blade Wedge Design" filed Jul. 10, 2020 and assigned Ser. No. 63/050,655, describing inventions made by the present inventor, and herein incorporated by reference.

BACKGROUND OF THE INVENTION

1. Field of the Invention

The present invention relates to helicopter rotor vibration reduction tracking wedges; in particular to the ramp profiles upon the trailing edge of rotor blades for the purpose of controlling acoustic effects.

2. Description of Related Prior Art and Blade Modifications in Unrelated Arts To control dynamic vibrations of rotor blades, weights and trim tabs have been used and attached on the blades. Ramp tabs have also been known in the art for improving the dynamic vibration control on helicopter rotor blades. The inability to make field changes has made permanently bonded ramp tabs impractical as a primary method for periodic blade tracking and vibration reduction. Field installable tracking wedges represent a practical solution to issues of tracking and vibration issues. However, such tracking wedges can often result in an unwanted acoustic profile as the blades rotate.

Field installable (and removable) rotor blade vibration wedges represent the state-of-the-art in flexible dynamic vibration taming. For instance, U.S. Pat. No. 8,192,162 teaches numerous elastomer profiles useful for adapting rotor blade shapes to minimize or defeat vibration effects. Numerous wedge shapes have been proposed as field-installable adhered elastomer profiles onto the top surface (towards trailing end) of the rotor blade. When focused on the action of a single rotary blade, the influence of trailing edge design, on the noise generated by movement, has been attributed to both turbulent boundary layer trailing noise (generated by the turbulent boundary layer passing over the trailing edge), and blunt trailing edge noise (generated from von Karman vortex shedding over the blunt trailing edge). Geometric shapes described and commonly used in the prior art have been linear modifications to the top-side wedge. However, geometrically linear wedges suffer a slight drawback in that their shape, particularly the trailing end, can cause turbulent vortices behind the rotating blade, resulting in undesirable noise, such as chirping, popping, or ringing, that can be distracting to pilots and others within the vicinity of the operating helicopter rotor blades.

Noise is common in the helicopter art, but an increase in acoustical noise has been observed with the use of certain planar or blunt profile geometries on the aerodynamic behavior in the vicinity of the trailing end of operational helicopter rotor blade airfoils. The source of this noise has been attributed to the properties of the turbulent boundary layer convecting over the trailing end due to abrupt termination at the rear ends of the installed profile. Larger turbulent air structures convecting into the wake can lead to relatively complex unstable vortex structure.

For the purpose of airfoil noise analysis, aerodynamic noise produced near trailing ends of airfoils is strongly dependent on the flow, vortex shedding, lift-to-drag ratio, and laminar separation, transition, and reattachment of the shear layer. The shedding from the separated shear layer has been attributed to Kelvin-Helmholtz instability that can cause characteristic acoustic frequencies. Vortex frequency peak is consistent with the fluctuations of the lift-and-drag coefficients, and the shedding of the trailing edge vortex. This frequency is also close to the results of trailing end vortex shedding by tonal noise frequency.

Another major source of aerodynamic noise results from vortices near the trailing end. Work has been attempted to reduce pressure fluctuations near that region (above and below, as well as behind the trailing end). Further improvements to noise-reduction profile shapes in tracking wedges have been proposed specifically for acoustic management. Span-wise angular serrations have been implemented on the tab upper surface to reduce the amount of turbulence created by airflow as the air moves radially across the blade. Varied peak and valley designs have been implemented on the wedges, or otherwise cut into the rotor upper surface. Attenuation of tonal noise was associated with the influence of the serrations on the T-S (Tollmier-Schlichting) wave and the separation bubble. Serrations can weaken the instability of the T-S wave, and prevent amplifications of the instability due to the separated boundary layer. Current serration trailing edge treatments aim to improve mixing. The serration decreases noise by reducing the associated velocity non-uniformities of the wake. With high Reynolds numbers, breaking down the von Kármán vortex sheets produced by the blunt trailing edge suppresses the von Kármán vortex sheets resulting in a reduction in the vortex shedding noise. However, stagnant pockets, and shock pressure waves, at the trailing (and/or suction) end collapse or implode causing perceptible discreet audible events.

Tonal noise frequency observed corroborates this finding. The frequency is consistent with the vortex shedding frequency at the pressure side of trailing end. Flow around an airfoil causes trailing-end noise to be produced by the flow over the airfoil. Flow separation and oscillating vortex formation and shedding noise has been found to be a secondary and unwanted issue with the use of airfoil tracking wedges having a triangular shape in cross-section.

A modification of tracking wedge termination profiles has been found to reduce the increased noise associated with the installation of profiles on a rotating helicopter blade. Further improvements to noise-reduction profiles in tracking wedges have been proposed for acoustic management. While angular serrations on the wedge upper surface reduce the amount of turbulence created by airflow as the air moves radially across the tracking wedges, these solutions lack the appropriate geometries necessary to provide acceptable improvement in acoustic noise production and reduce the effectiveness for correcting dynamic vibration. Varied peak and valley designs, or otherwise cuts into the rotor upper surface, may minimize noise, however, these more cumbersome approaches lack the versatility and effectiveness of field-installable wedges.

Profiles and adjustment of rotating blades have been known in this and other arts. For example, in the unrelated art of axial propellors, Mosciewicz, U.S. Pat. No. 4,618,313, discloses a large, high-deflection, trailing-edge flap that "increases the effective displacement of air in an axial propeller, whose blades are not twisted . . . ". As the Mosciewicz disclosure states, such structures are intended for axial flight conditions, such as fans or propellers experience; it is neither intended nor suitable for the forward (edgewise) flight conditions of a helicopter rotor. Further, while Mosciewicz disclosure may produce a large pitching moment, this is strictly limited to negative (nose-down) moment as the device is only deflected to increase the displacement of air through the rotor, that is to increase the thrust, which requires a downward flap deflection. The Mosciewicz device can only be used on untwisted blades, whereas almost all modern helicopter rotor blades incorporate twist, and therefore the Mosciewicz disclosure is unrelated, unuseful in the art of helicopter blades, and would not achieve a purpose of helicopter rotor blade attachable profiles.

In the unrelated art of wind turbines, Singh et al, US 2015/0292522 A1 attempts to reduce operational noise of a blunt blade trailing edge. As in Mosciewicz, this is unrelated to the art, and unsuitable for forward (edgewise) flight. Singh's windmill blade enhancement is preferably mounted on the pressure side (lower side) of the blade. Even though Singh is intended to reduce vortex shedding and noise, this is accomplished by redirecting the upper-surface and lower-surface flows so that they converge behind the thick trailing edge of a windmill blade. Singh's device would not produce any amount of pitching moment, as the slope of the additional camber introduced by Singh's device reverses sign as you move towards the trailing edge, the pitching moment produced by the forward section of Singh's device will necessarily be countered by the pitching moment added by the aft section of the device; for this reason, Singh's disclosure does not alter the pitching moment and is unsuitable for application to the art of helicopter rotor smoothing.

In the art of helicopter Gurney flaps, Perry et al., 5,492, 448 discloses a Gurney flap as a small device placed at the trailing edge of an airfoil, perpendicular to the chord and extending into the airflow. As is known in the art, Gurney flaps are essentially always placed on the lower surface of the airfoil in order to increase maximum lift capability. Perry's disclosure only discusses static airfoil loads without regard to noise. The Gurney flap inherently increases the blunt trailing edge thickness of the airfoil, as is seen in all the alternative embodiments shown in Perry's FIG. 12. Very generally Gurney flaps, and Perry's device's increased thickness will increase the likelihood of von Karman vortex shedding and its associated noise, rather than eliminating this noise as the current invention does. Perry also discloses a feature, #27 in FIGS. 10B and 10C, that is a small bump on the lower surface of airfoil to increase the thickness of the boundary layer so that the effect of the Gurney flap is washed out at low and negative angles of attack. Such a feature will not produce a useful pitching moment for the same physical reason that the disclosures of Singh et al. (above) does not.

In the art of air foils, Vijgen et al., 5,088,665 discloses a serration on the aft edge of a rotor blade. Vijgen attempts to improve aircraft lift and drag but describes no mechanism by which it does so and shows no data to support its effectiveness. Vijgen's disclosure makes no mention of altering either pitching moment or noise. Serrations are used to reduce noise on many modern aircraft, especially on engine nacelles. However, the noise that serrations can reduce are boundary layer turbulence noise and noise due to shear layers. For these noise sources, the pressure amplitudes scale with the cosine of the angle at which the flow leaves the trailing edge. The physics and characteristics of these types of noises are very different than shed vortex noise; and serrations do not eliminate the shed vortex noise.

Therefore, it is an object of the present invention to provide a quiet rotor smoothing wedge as an attachable (and in some instances detachable) device with a specific cross-sectional profile that, when installed onto the trailing edge of a helicopter rotor blade, provides a controlled change to the pitching moment of the blade while eliminating undesirable audible acoustic noise. Pitching moment is the characteristic of the helicopter rotor blade to want to pitch up or down during flight. Installing a particular wedge segment may reduce any aerodynamic imbalance between blades. A segment of wedge alters the pitching moment of the blade it is installed onto with the goal of making all the blades on the helicopter have similar or the same pitching moment characteristics.

Therefore, it is a primary object of the present invention to provide an acoustically preferred profile for attachment to a rotor blade.

It is another object of the present invention to provide a helicopter rotor blade accessory for management of vibration and/or acoustic properties.

It is yet another object of the present invention to cure pitching, tracking, and vibrational issues in rotor blades such as by altering the local aerodynamic pitching moment, with attention to managing sound and chirping.

It is as yet another object of the present invention to provide an attachable profile that is equally suitable and effective on either surface of a rotor blade.

It is another object of the present invention to use a rotor blade attachable profile to effectively convert a thick(er) trailing edge to a thin trailing edge to produce a substantial pitching moment by using camber as far aft on the airfoil section as possible, where it is most effective.

These and other objects of the present invention will become apparent to those skilled in the art as the description thereof proceeds.

SUMMARY OF THE INVENTION

The present invention is directed to a system and method of reducing vibration created by helicopter main rotor blades or tail rotor blades, or airfoils generally, by use of an attachable and detachable profile. The profile is specifically shaped to minimize acoustic profile during rotation of the blades. Preferably, an adhesive system allows convenient installation and removal onto top or bottom surface of the rotor blade and/or tab, and/or may be adhered to the trailing end of the blade and/or tab. The shape profile may extend rearward and thus expand the effective rotor chord length, in trailing direction, to minimize turbulence flow without negatively impacting blade performance. The profile may be adhered to the top surface or bottom surface of the rotor blade, or a trailing tab set on the rotor blade, and/or may be adhered to the trailing end of the blade and/or tab.

The profile, as a tracking wedge, may include a body configured for attachment to an aerodynamic surface at or near the trailing end, along top side, underside and/or trailing edge, with acoustic management shape. The acoustic management shape may be disposed proximate to the trailing edge of the tracking wedge. The preferred acoustic management shape includes a rearwardly expanding wedge with a curvi-linear trailing convex body configured to modify turbulent vortex in the shear layer as air moves over a surface of the tracking wedge and trails there behind. The tracking wedge may extend over the top and/or bottom side of the airfoil/blade and also covers at least a portion of the trailing surface of the rotor blade and/or trailing tab. The portion of the trailing surface of the blade covered is preferably at least 50%, more preferably at least 80%, preferably at least 90%, and when feasible the profile extends to cover 100% the height of the trailing surface to minimize the discontinuity of the trailing end of the blade with profile attached.

The trailing edge of the profile may include a curved rear edge. Off the trailing end, the profile thereto adhered may form a curved path to the rear top point/line of the profile. The wedge profile may cover or extend over less-than-full part of the height of the trailing end or completely cover the height of the trailing end of the tab/blade, but most preferably covers at least half of the height of the trailing end, more preferably at least 80%, more preferably at least 90% and most preferably covers the height of the trialing end of the tab/blade.

A profile may extend rearward of rotor tailing end to encompass, or occupy, a predetermined vortex structure zone(s) in the flow field. After determining vortex turbulence created by movement of rotor with wedge profile attached, and designing or emplacing, the profile may encompass the space or otherwise modify geometry of the trailing edge of an airfoil via application of a wedge profile with minimal modification of the camber.

BRIEF DESCRIPTION OF THE DRAWINGS

The present invention will be described with greater specificity and clarity with reference to the following drawings, in which:

FIG. 1A illustrates a top view of a rotor blade including two separate attached profiles of the prior art;

FIG. 1B illustrates a side view of a profile of the prior art;

FIG. 1C illustrates a top perspective view of a profile of the prior art;

DETAILED DESCRIPTION OF THE PREFERRED EMBODIMENTS

Figures 2A, 2B, 2C:
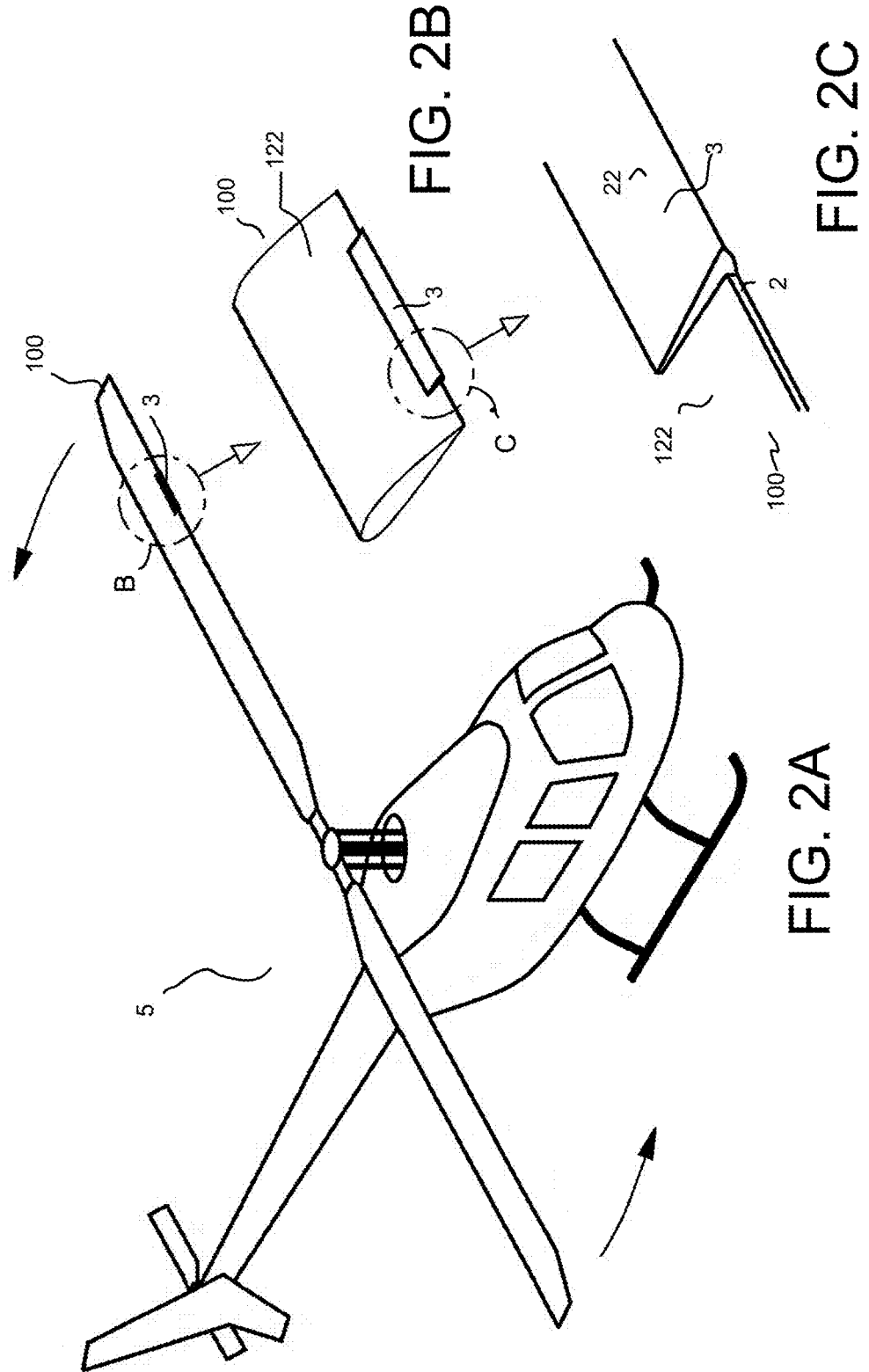
FIG. 2A illustrates a perspective view of a helicopter aircraft with profile attached to one rotor blade.
FIG. 2B illustrates a magnified view of Section B of FIG. 2A.
FIG. 2C illustrates a magnified view of Section C of FIG. 2B.

The quiet rotor smoothing wedge (or more generally, profile) reduces vibration and improves track of helicopter rotors in forward (edgewise) flight without producing noise otherwise due to turbulent oscillating aerodynamic vortex shedding, technically known as von Karman vortex shedding. The use of an attached smoothing wedge/profile produces a pitching moment, either positive or negative, which twists the blade and so alters its dynamic behavior. The pitching moment is due to the addition/modification of camber at the trailing edge of the blade's airfoil. An upper surface application gives a nose-up pitching moment, while a lower surface application produces a nose-down moment. The use of an attached profile reduces or eliminates the shed vortex wake associated with a thick trailing edge by smoothly reducing the thickness towards zero while maintaining the aft camber.

The quiet rotor smoothing wedge may be an attachable/detachable device with a specific cross-sectional profile that, when installed onto the trailing edge of a helicopter rotor blade, provides a controlled change to the pitching moment of the blade while eliminating undesirable audible acoustic noise. Pitching moment is the aerodynamic characteristic of the helicopter rotor blade section tending to twist the blade nose-up or nose-down in flight. The reason for installing a wedge segment is to dynamically match the rotor blades to each other and so reduce the vibratory loads to the helicopter.

The quiet rotor smoothing wedge may have a specific cross-sectional profile and length. The profile may be affixed to a rotor blade trailing edge at defined locations. The length and location of installation of the wedge may be determined by a rotor smoothing process. The process measures rotor induced vibration and determines an appropriate wedge solution. The process can involve a sophisticated onboard diagnostic system or just a simple device to measure vibration along with a wedge correction chart for the helicopter. To reduce any dynamic mismatch between the blades, the solution will define which blade requires correction, the required length of wedge, the radial location where the wedge segment should be installed, and whether the wedge segment should be installed onto the upper or lower side of the blade at the trailing edge. Once the correct wedge solution is installed, the dynamic mismatch and associated vibration will be mitigated.

Prior to modern systems that directly measure rotor induced vibration on the helicopter airframe, vibration reduction was performed by measuring the difference in the rotational tip path of each rotor blade on the helicopter. The preferred historic method of assessing rotor blade tip path throughout a range of flight conditions (hover through forward flight) was to attach a small unique visual indicator marker or tab to the tip of each rotor blade on the helicopter. These unique indicators were comprised of a discrete color or numerated feature. With the use of a synchronized strobe light operated by the pilot or flight crew, a visual assessment could be observed. The prior standard practice in the art of helicopter vibration mitigation equated the separation of rotor blade tip path to perceived vibration magnitude. In the early history of helicopter operations, the reduction of blade tip path separation generally resulted in a reduction in rotor induced airframe vibration. Corrections were executed by adjustments to weights, pitch links and bendable metal trailing edge trim tabs. This method is referred to as 'Rotor Track and Balance'. Modern helicopter rotor vibration mitigations methods, commonly referred to as 'Rotor Smoothing' emphasize airframe vibration measurements over rotor blade tip path measurements. Due to a long deep history, modern helicopter 'Rotor Smoothing' procedures are often referred to as 'Rotor Track and Balance'.

The cross-sectional profile of the quiet rotor smoothing wedge is designed to alter the local aerodynamic pitching moment of a helicopter rotor blade when installed into the trailing edge of a blade. This is accomplished by altering the amount or direction of camber at the trailing edge of the blade. The mean camber line of an airfoil is the curve that is halfway between the upper and lower surfaces. A wedge installed onto the upper trailing edge of a blade will result in an upward shift in the mean camber line at the wedge location, and vice-versa, a wedge installed onto the lower surface will result in a downward shift in the mean camber line at the location. Camber at the trailing edge is the primary determinant of airfoil pitching moment. The camber change from an upper surface wedge will add nose-up pitching moment, while a wedge on the lower surface will add nose-down pitching moment.

The cross-sectional profile of the quiet rotor smoothing wedge is also designed to minimize turbulent oscillating aerodynamic vortex shedding (von Karman vortex shedding) behind the blade trailing where a wedge is installed. A reduction in the magnitude of a vortex shedding condition eliminates the audible acoustic signature associated with the use of standard rotor smoothing wedges.

The cross-sectional profile of the quiet rotor smoothing wedge is distinguished from the standard smoothing wedge in that it is also designed to minimize the shed oscillating aerodynamic vortex behind the blade trailing where a wedge is installed. This shed vortex is known as a "von Karman vortex street", and is due to the thickness of the blunt trailing edge. This vortex produces a characteristic and often objectionable noise. A reduction in the trailing-edge thickness reduces the magnitude of the vortex shedding and so eliminates the noise associated with the use of standard rotor smoothing wedges.

The cross-sectional profile of the quiet rotor smoothing wedge is configured with multiple geometric characteristics. The profile includes two surfaces that directly interface with the exterior surfaces of the rotor blade. The primary interface surface of the quiet wedge profile contacts the upper or lower exterior surface of the blade at the trailing edge. The function of this interface is to provide a significant area for adhesion of the wedge profile to the blade. The secondary interface surface of the quiet wedge profile contacts the vertical trailing edge terminus of the rotor blade (or is situated adjacent thereto, or as near as possible without being affixed). The trailing edge of most helicopter rotor blades do not terminate with a zero-thickness due to the practical construction limitations of mechanically joining the upper and lower trailing edge skins. As a result, most helicopter rotor blades have a thin, but discrete, trailing edge thickness. The cross-sectional profile of the quiet rotor smoothing wedge is configured to wrap around and cover the vertical surface of the blade trailing edge.

Figure 6:
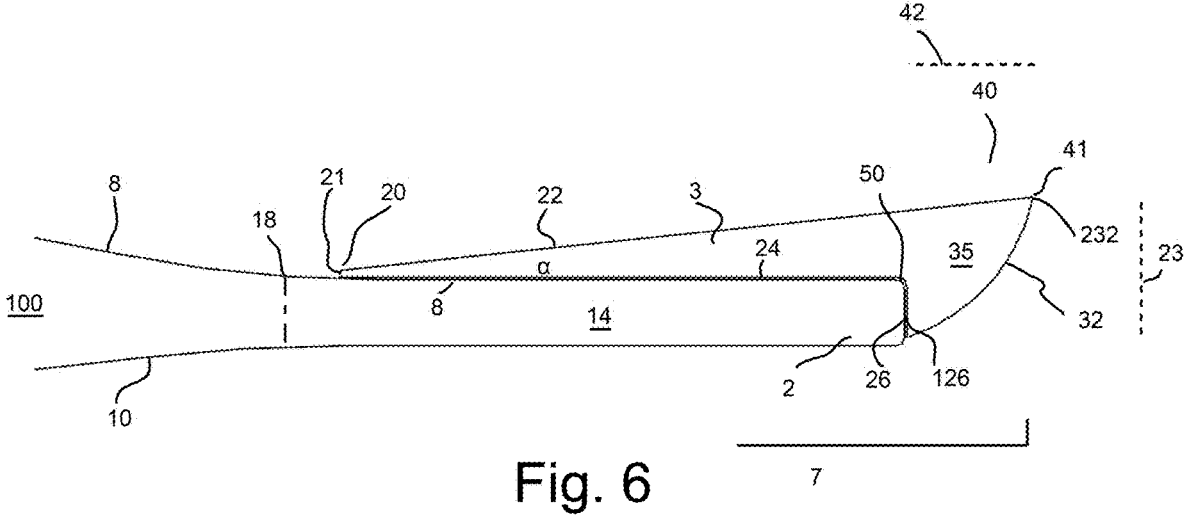
FIG. 6 illustrates a close-up side cross-sectional view of the trailing end of a rotor blade with an embodiment of a profile applied thereon.

The forward edge (reference numeral 21, as seen in FIG. 6, et seq.) of the quiet rotor smoothing wedge coincides with the forward edge of the primary bonded surface of the wedge/blade interface. The forward edge of the wedge has a minimal thickness to reduce the peeling forces on the bonded interface due to aerodynamic flow over the surfaces of the rotor blade and installed wedge. The quiet wedge tapers in thickness from its thin leading edge towards its trailing edge to create a ramp configuration with increasing thickness near the trailing edge of the rotor blade. When installed, this ramp shape alters the mean camber line of the blade/wedge assembly to change the local pitching moment of the blade.

The geometry of the quiet rotor smoothing wedge may extend rearward beyond the trailing edge of the rotor blade in both the horizontal and vertical directions. The wedge profile extends past the primary horizontal bonded surface of rotor blade. The wedge also wraps around the trailing edge terminus of the rotor blade in a vertical direction. The aft geometry of the quiet wedge is configured with a convex transitional shaped surface that connects and terminates the geometry between the extreme aft edge of the ramped surface and the extended vertical edge behind the trailing edge of the blade (towards the opposing lower/upper surface). This convex shape provides a gradual geometric transition between the lower or upper surfaces (opposite the affixed surface) at the blade/wedge trailing edge. The smoother transition reduces or eliminates any discontinuities at the trailing edge of the blade, and allows the curvilinear rear surface of the profile to effectively reduce the effective thickness of the trailing edge (of blade with profile applied) and so reduces the flow separation and the magnitude of the oscillating vortex shedding (von Karman vortex shedding) behind the trailing edge of the blade/wedge assembly. This reduction helps eliminate audible acoustic noise associated with thick blunt rotor blade trailing edges. The important characteristic of this new quiet wedge geometry is that it reduces the effective trailing-edge thickness of the airfoil/wedge assembly (coming to rear point at top rear end corner 41, see FIG. 6 et seq.) without adding a reverse camber that would counter the pitching moment produced by the wedge. The camber effect on pitching moment becomes more powerful as the camber moves aft toward the trailing edge. Even a small amount of reversed camber at the trailing edge can greatly reduce the wedge's effectiveness as a pitching moment generator. The new quiet wedge profile preserves the aft camber and so maintains or even increases the desired pitching-moment change.

Wedge design concepts are sized and shaped to mitigate noise. Quiet wedge profiles cause minimal acoustic side-effects while managing rotor-induced vibration, and optionally improving blade tracking. The improvements are provided by utilizing installable profiles, a.k.a. wedges. The profiles are also useful in test rigs or shop measurements to provide initial rotor adjustment. Field adjustments over the service life of a helicopter rotor blade are enabled without the need for the rotor blades to be removed from the helicopter. Field adjustments may be conveniently done with greater precision and repeatability utilizing precisely known geometric additions to a rotor that do not unduly raise acoustic decibel levels. Profiles of specific geometry are affixed to the trailing end of the rotor blade for the purpose of providing a small aerodynamic change to the blade.

A rotor blade may be fitted with a wedge on various locations of the rotor blade towards the trailing edge. The wedge may be used to alter the aerodynamic properties of the rotor blade to correct for vibration imbalance conditions. The wedge may be configured for attachment to an aerodynamic surface, such as the rotor blade airfoil.

U.S. Pat. No. 8,192,162 (issued Jun. 5, 2012 to Loftus, et al., herein incorporated by reference) discusses the selection of an elastomer as an optional material for this device. Loftus, et al. taught that the cross-section of the profile is small in area, the device should strain at the same magnitude as the rotor blade surface to which is attached. When applied by an adhesive, it has been shown that shear strain in the adhesive is directly proportional to the material stiffness of the profile device. Pressure sensitive adhesive (PSA) systems were therefore preferred for ease of installation and removal by aircraft mechanics in a field environment.

When attached to the top or bottom surface near the trailing end of the airfoil, the profile modifies the overall airfoil geometry, and may, in some examples, change the manner in which air flow moves over the blade-profile combination, creating less audible noise than a similarly configured tracking wedge without the acoustic management shape. In other examples, a tracking wedge may include an acoustic management shape profile on the trailing end of the blade.

Profile shape has an effect on the aerodynamics of a given rotating rotor blade that may be dependent on the width, the angle, and the length of the profile in addition to its span-wise placement on the rotor blade. It is also known that the profile geometry and shape can impact flow pattern on the trailing end, and that certain curvilinear, and other, shapes are preferable to reduce vortices (number and/or size) in the shed shear layer. Acoustic management is possible by tailoring the acoustic effect of the profile with varying shapes. Thus, modifying the trailing edge of the profile to modify the airflow trailing end can reduce the amplitude of turbulent oscillating aerodynamic vortex shedding (von Karman vortex shedding).

To correct for unwanted noise generation, the profile may include various acoustic management shapes disposed proximate to the trailing edge of the profile and impinge the resonance zone of oscillating aerodynamic vortex shedding otherwise caused during use, and emplace a profile with shape extending beyond trailing end of airfoil to minimize resonance zone. By inhabiting space of expected shedding, the profile can minimize vortices and pressure differentials at or beyond the airfoil trailing end. Acoustic management shapes may include variable trailing edge configurations to modify the movement of air moving over a surface of the tracking wedge. A profile may be adhered to the top or bottom of the airfoil, and optionally additionally along the trailing end of the airfoil. In other embodiments, a profile may adhere to the top, bottom, and trailing end of the airfoil, and in other embodiments, the profile may simply adhere to the trailing end of the airfoil.

As seen in the Figures, the wedge shape profile, may be configured to modify the manner in which air flows over the tracking wedge profile 3 from a leading side 21 to the trailing curvature 32 and top corner of tracking wedge profile 3. The size and spacing of the acoustic management mechanism may vary depending on the particular application. In some examples, a balance between the number, size, and effect of the acoustic management mechanism and the amount of adjustment necessary to correct for improper rotor induced airframe vibration may be desirable.

In some examples, the profile may be shaped to provide for a desirable upforce or downforce to adjust for improper blade tip path tracking or rotor induced airframe vibration, or other methods used to modify a movement of trailing end airflow in a manner that provides a suitable path to reduce noise for air leaving the profile. The more suitable path, in some examples, may reduce the amount of disturbance placed on the air moving over, and leaving, the surface of the profile, which in some examples may reduce the noise generated by the airfoil with profile attached.

When applied to a rotating blade, the profile alters the response of the rotor blade by adding camber to the airfoil near the trailing edge. Camber changes the aerodynamic pitching moment of the airfoil, and the further aft the camber, the more effective it is at doing so. Smoothly decreasing the thickness of the airfoil-wedge assembly to a minimum at the trailing edge thickness at its terminus has been found to help reduce the noise produced. But doing so within the limit of the original airfoil trailing end necessarily adds or modifies camber that opposes the desired camber from the wedge and does so at the most effective location. The result would be a wedge that is quiet but improperly changes the blade's dynamic response in an undesirable condition. By increasing the aft most extent of the wedge to beyond the trailing end of the airfoil it is possible to both smoothly decrease the thickness of the airfoil-wedge assembly and maintain or even increase the desired aft camber. This yields a wedge that is both effective at altering the dynamic response of the blade and reduces noise. Any wedge profile that extends beyond the airfoil's trailing edge, smoothly reduces the total thickness of the assembly as the trailing edge of the assembly is approached, and which preserves or increases the camber of the assembly in the desired direction between the trailing edge of the original airfoil and the trailing edge of wedge-airfoil assembly may be useful.

Each of the profiles has suitable adhesion to ensure that it remains in place during service of the airfoil to withstand shear forces due to centrifugal force of rotation and peel forces from aerodynamic impingement during flight. The blade chord dimension extending between the leading edge 101 and trailing surface 102 of the airfoil 100 may be extended rearward by a profile 3. The span dimension may be measured in the direction from the center of a rotor radially outward to the tip of the rotor. In a preferred embodiment, a profile may be installed on the trailing end of a helicopter rotor blade (with respect to the motion of the blade through the air). The profile can be installed on either the upper or lower side of the rotor blade trailing end, and may also extend rearward past the trailing end 2.

The effect that a short segment of profile has on the aerodynamics of a rotating rotor blade may be similar to the effects of a bending adjustment made to a conventional metal trim tab. Both devices cause a local change to the aerodynamic pitching moment at the location of change. Although small, these changes can correct differences within a rotating set of blades resulting in lower vibration and a better rotor track condition. The benefit of providing adjustment at a variety of span-wise locations along rotor blade is that rotor vibration and tracking can be optimized throughout a range of forward speed of the helicopter. As the helicopter flies faster, the span-wise regions of the blades that provide the greatest contribution to lift will vary whether the blade is advancing in the direction of flight or retreating. As a result, adjustments can be made at varying span-wise location(s) along the blade in order to reduce vibration and improve tracking throughout the range of airspeeds that the helicopter can fly. The adhered profile may be applied at any span-wise location with any desired angle or span-wise length. A greater degree of adjustment to vibration and track through a wider range of airspeed can be made without the necessity to modify the basic design or construction of the rotor blade itself. As the speed with which the profile moves relative to the vehicle depends on the span-wise location, a different profile geometry may be preferred to minimize acoustic disturbances at each span-wise placement. In some embodiments, the profile may include a variety of cross-sectional shapes that change in the span-wise direction. For instance, a sharp angle may be preferred towards the tip of the airfoil, and a wider angle may be preferred on the rotor-facing portion of the profile.

The profile may be aligned on the trailing end of a helicopter rotor blade as already illustrated in FIGS. 1A-C. In prior art installations, the wedge trailing edge side 402 of the profile 103 and the trailing surface 102 of the helicopter rotor are substantially aligned.

Utilizing this invention, a rotor blade may be initially statically mass balanced to within acceptable tolerances or receive an initial satisfactory balance on a ground-based test stand. Airframe vibration and rotor track measurements are then measured in an actual flight situation. The vibration measurement is preferably done by an in-flight measuring system by use of accelerometers or with vibration sensors, as is known in the art. The amount of, shape of, and the location of, the corrective profile(s) is then added (or removed) and new magnitude of airframe vibration is again determined during flight. If unacceptable vibrations, tracking, or acoustic properties are still experienced, corrections can again be made by the addition or removal (and replacement) of adhering profiles. In-flight testing may be continued by iterative measurements, and as needed corrective changes may be made until desired parameters are achieved. In helicopter embodiments, both the main lifting rotor blade and the tail rotor blade can be adjusted by the systems and methods of this invention.

As can be seen in the prior art indicated in FIGS. 1A-1C, rotor blade 100 includes a leading edge 101 and a trailing end surface 102 when viewed from the top. As is common, rotor blade 100 attaches to a rotor head via lugs 104. Rotor blade includes span B from the rotor head to outboard rotor blade tip end 105. Profile shapes 103a and 103b of varied length at different positions along radial extension are shown along trailing end surface 102 (here shown along a top surface 122 of rotor blade 100). Profile expand spanwise to ends 303. The blade chord dimension A extends between the leading edge and trailing end. The span dimension B is measured in the direction from the center of the rotor radially outward to the tip of the rotor as shown. Profile has thin leading edge 201, with ramp angle E and elongated wedge chord dimension C. Span-wise placement (along with upper or lower side placement) of segment length D of the profile on the surface of the rotor blade 101 will vary depending upon the specific vibration and track corrections needed.

As can be seen in FIGS. 2A-C, an embodiment of the present invention is shown applied to an aircraft 5 (as a helicopter with two rotor blades). Rotor blade 100 travels in a circular path indicated by the arrows to provide for mobility and lift to the aircraft. Profile 3 is attached to blade 100 at or near the trailing end 2 of the blade 100. Profile 3 is adhered (as shown) to the top surface 122 of the blade with the top side 22 of profile 3 exposed upwards. As discussed herein, the profile may alternatively or additionally be placed along the lower surface.

Figures 3, 4, 5:
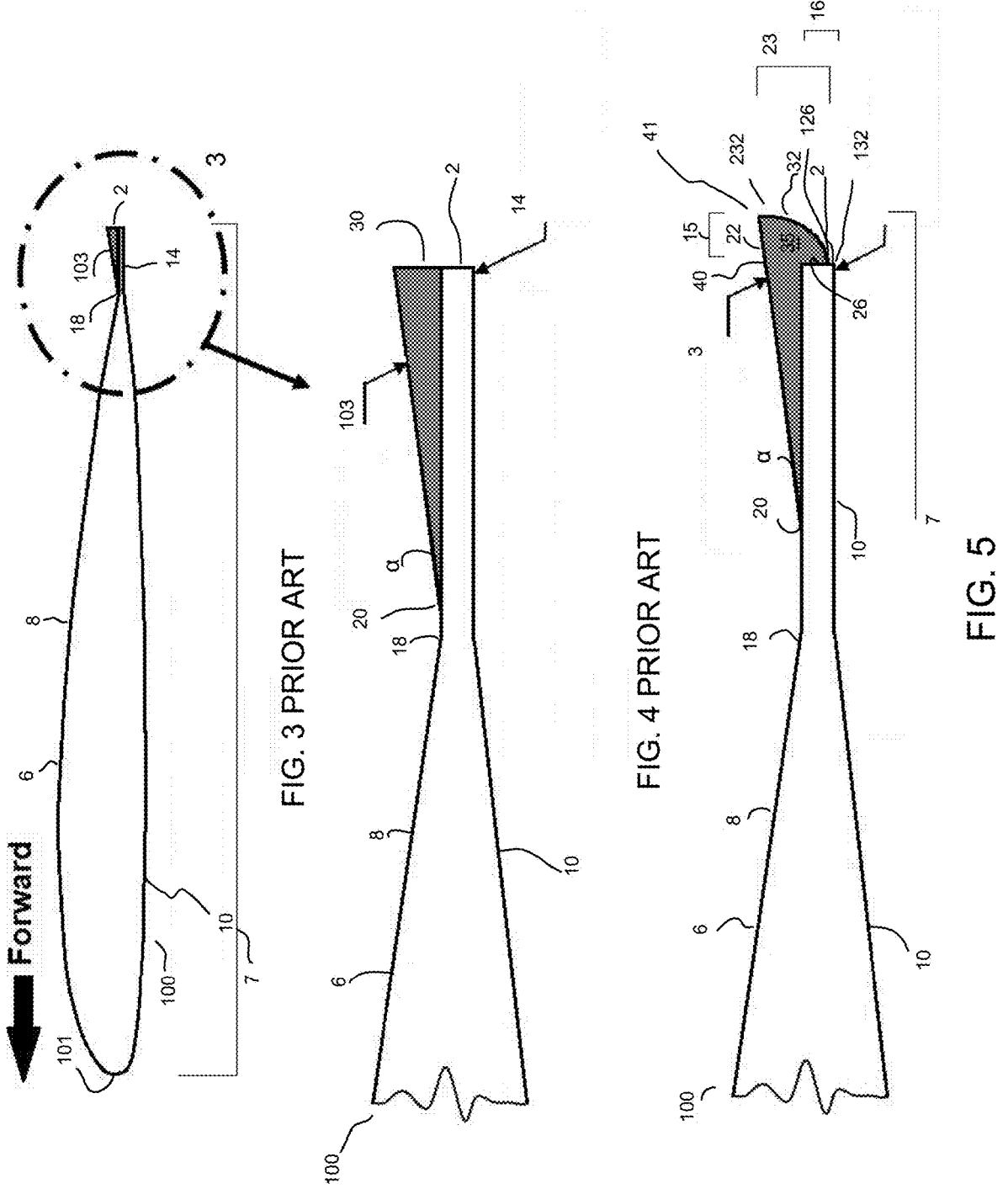
FIG. 3 illustrates a side cross-sectional view of a blade airfoil with profile attached at trailing edge of the prior art.
FIG. 4 illustrates a close-up side cross-sectional view of the trailing end of a rotor blade with an embodiment of a wedge applied thereon of the prior art.
FIG. 5 illustrates a close-up side cross-sectional view of the trailing end of a rotor blade with an embodiment of a profile applied thereon.

FIG. 3 shows a side cross-sectional view of rotor blade 100, including leading edge 101 and trailing end 2 of rotor blade (airfoil) 100 defining chord length 7 (chord shown with reference "B" in FIG. 1). Rotor blade 100 includes upper camber 6 along upper surface 8 with a preferably slightly cambered lower surface 10. As shown, profile 103 is set along trailing edge 2 on upper surface 8. Rotor blade 100 may include trailing tab 14 (as shown) wherein cambering of upper and lower surface are diminished to provide more horizontally extending trailing tab 14, as is common on certain rotor blades in service. Tab 14 meets upper camber 6 at camber terminal 18 (an artificial span-wise line or plane drawn between top and bottom of blade at points (lines) where cambering profile is modified in the tracking direction).

As shown in FIG. 4, prior art standard wedge profile 103 is shown on upper surface 8 along trailing end 2 of rotor blade 100. Trailing end 2 of blade/tab may correspond with trailing side 30 of wedge profile 103 to form a smooth (approximately vertical) line/plane at the rear. Wedge profile 3 creates angle α at leading corner 20. As shown, trailing side 30 of profile 3 may be vertical and/or parallel with trailing edge of tab.

As can be seen in FIGS. 5-8, profile geometry may be used in embodiments of the present invention for wedge profile 3 as a quiet wedge. Wedge profile 3 may have leading corner 20 set rearward of blade leading edge at forward end of wedge, towards trailing end 2, whereby corner 20 is installed further from camber terminal 18 relative prior art installations, where camber 6 of upper surface 8 of blade 100 terminates towards trailing end 2. Alternatively, chord-relative placement remains unchanged from the prior art. Wedge profile 3 may effectively extend chord length 7 by chord extension amount 15, by hanging beyond trailing end 2 of blade 100 to extend the total chord length 7 of rotor blade 100. In the embodiment shown in FIG. 4, radius curvature from bottom right beginning of bottom curvature 132 along arc 32 to far end curvature 232 forming convex body 35 to top corner 41 (top rear end corner) of profile 3. Trailing curvature 32 may be structured as a partial arc of a circle or parabola, forming a cylindrical section when considered spanwise in three-dimensions. Wedge profile 3 may include overhang body 40, set around top trailing corner 50 of blade/tab) as part of convex body 35 forming a total wedge length 42 defined rearward from bottom curvature 132 to top corner 41, including a portion dipping below upper surface 8 of tab 14 to cover (at least a portion of) trailing surface 2. Overhang preferably extends down more than half of the height 16 of the trailing tab 14 trailing end 2, with total height of wedge 3 defined by height 23 from top corner 41 to bottom corner 132. In an alternative application of the embodiment, profile wedge may be installed on the lower surface 10, and/or also may be installed on trailing end 2. Preferably, profile vertical side 126 is set opposing, adjacent, or preferably in contact with trailing surface 26 of trailing end 2 of blade/tab. As stated above, placement on lower surface alters mean camber line at trailing end in the opposite direction. Profile 3 may optionally be adhered to trailing surface 26 of tab 14.

Figure 7:
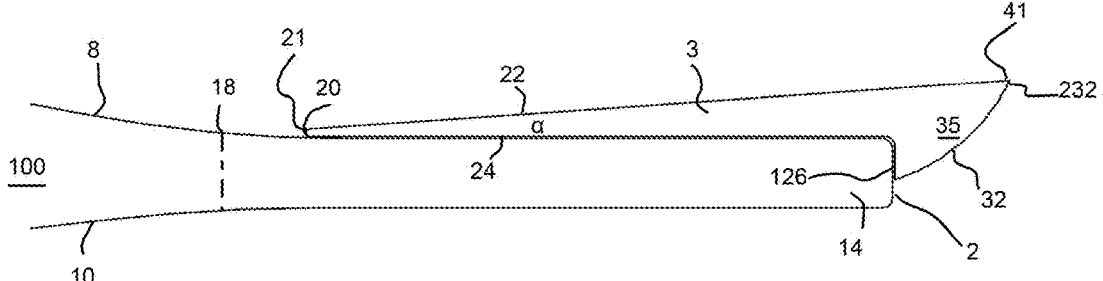
FIG. 7 illustrates a close-up side cross-sectional view of the trailing end of a rotor blade with an embodiment of a profile applied thereon.

FIG. 3 illustrates a side cross-sectional view of a rotor blade airfoil 100 with standard wedge 103 installed where profile 3 may be placed. FIG. 4 demonstrates a close-up view of trailing end 2 of rotor blade 100 in side cross-sectional view magnified. FIG. 4 illustrates a prior art type wedge profile 103 shown along upper surface 8 of rotor blade 100, here shown along upper surface 8 of trailing tab 14. Rotor blade upper surface 8 includes cambering with a camber terminal 18 towards the joint with trailing tab 14. Lower surface 10 leads, in trailing direction, towards camber terminal 18. Camber terminal may not align vertically as between upper and lower surfaces 8 and 10, respectively. As seen in FIGS. 5-7, wedge profile 3 includes angle α, and includes leading corner 20 forming a leading side 21. Leading side 21 of wedge profile 3 includes a short vertical extension of wedge raising off of upper surface 8. Wedge profile 3 includes top 22 and bottom 24, and is set over tab 14 with bottom 24 of profile mating, preferably adhered, with upper surface 8. Wedge trailing side 126 may align with trailing end 2 trailing surface 26 of tab 14 (or rotor blade 100). Alignment of wedge trailing side 126 with rotor trailing end 2 trailing surface 26 may be preferred, but is not necessary. In many embodiments, wedge trailing side 126 aligns slightly rear of (beyond trailing end) of rotor trailing end 2. Convex body 35 begins at lower curvature point 126 directly rear of trailing end 2 and extends along curvature 32 to top corner 41 at end of curvature 232. Angle α is preferably less than twenty degrees. The reduced angle wedge imparts varied vibrational and tracking properties, along with an improved acoustic profile.

Figure 8:
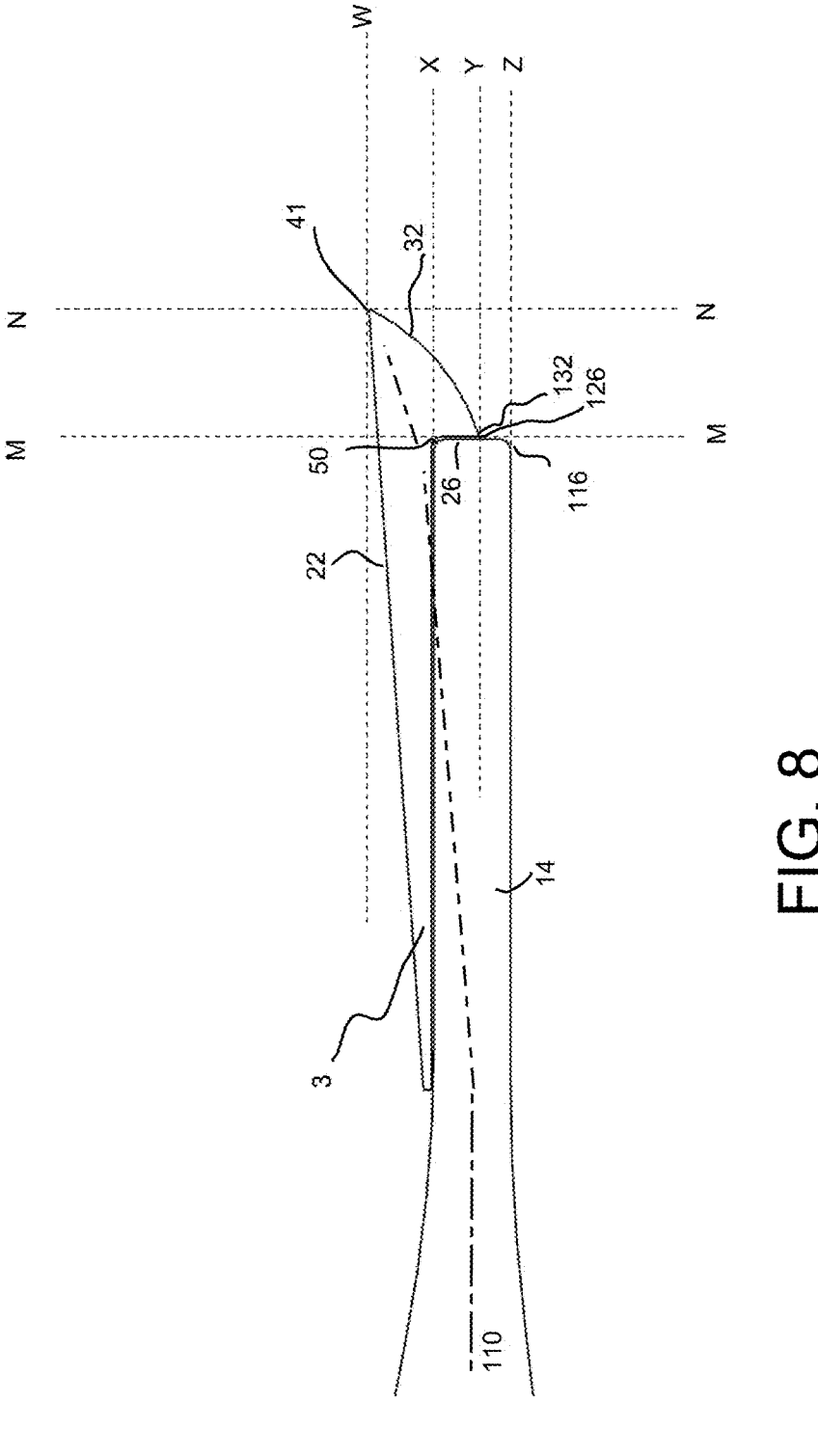
FIG. 8 a close-up side cross-sectional view of the trailing end of a rotor blade with an embodiment of a profile applied thereon.

As seen in FIG. 8, various dimensions of the profile are designed to improve performance and acoustic properties of the helicopter. Profile 3 may extend chord length rearward (rightward, a shown) by an amount from M (trailing end 2) to N (at top corner 41 of profile) adding distance M-N to effective chord length of rotor blade. Mean camber line 110 is defined as the mean of the effective upper and lower surfaces (or cambers) of the blade (shown left-to-right). The addition of the profile modifies the mean camber line in the direction of the surface upon which the profile is applied. The profile rises as high as top corner 41 defining the highest-level W of the system. Profile rises from top surface at level X to W, providing the total height of profile X-W above the blade. Overhang 35 provides vertical dimension X-Y to cover a portion of the trailing end 2 of the blade, blade trailing end 2 having total height X-Z from airfoil top trailing corner 50 to lower corner 116. The difference, or vertical discontinuity is measured as distance from lower surface at trailing end to the bottom arc point 132 of profile, or Y-Z. Preferably, the distance X-Y of vertical overhang minimizes the discontinuity Y-Z, or eliminates discontinuity, preferably at a maximum of half the height of trailing end, X-Z, from airfoil top trailing corner 50 to lower corner 132, and more preferably 80%, and more preferably at least 90%, and most preferably covering the entire height X-Z, so that Y-Z discontinuity is near or at zero. While it is preferable that the vertical surface 126 of the profile rests against or sits adjacent trailing surface 26 of the tab when applied, the wedge may not actually contact trailing surface 26 and be offset by a miniscule dimension. The distance (or width of line M) should be minimized to ensure that air pressure within any horizontal gap between trailing end and profile will prevent turbulence within gap and not provide any effective discontinuity to the air flow and mean camber line. As seen, the preferred shape of the quiet wedge will include a rear end 42 with a pie-wedge-type section as located between lines M and N in the horizontal dimension spanning vertically W to Y, with two near straight lines defined by top side of profile 22 and rear edge 126 (continuing along line M-M), with rear curvature 32.

One way to minimize unwanted acoustics is to minimize disruptions of air flowing opposite the wedge installation side, by minimizing disruptions to the camber line. Any airfoil section may be regarded as a thickness distribution plotted around a camber line. The actual blade shape is defined by a pair of camber lines above and below (top and bottom) of airfoil. By positioning the trailing lower corner 132 (lower trailing end corner) of profile 3 overhang near the blade trailing end lower corner 116, the discontinuity of the camber line is smoothed out. Arc curvature 32 causes a smooth taper shape at trailing end of airfoil and extends trailing end aftward. By gradually reducing the thickness of the trailing edge, airflow over the camber affects pitching moment of the airflow, without negatively impacting the camber line of assembly. A precisely arc-shaped wedge profile may be attached to the airfoil's trailing end so that the aft camber is maintained while thinning the trailing edge, so as to preserve pitching moment effectiveness and essentially eliminates audible noise. The features useful in accomplishing the pitching moment effectiveness and reduction in the vortex shedding noise are shown in FIGS. 9-10, with arc length 32 directing and impacting the vortex shedding, and top corner 41 (profile trailing corner) which defines length of overhang body 40 and convex body 35, and top corner 41 as the point 232 at which the trailing curvature 32 ends. When the airfoil is rotating, airflow around the attachable profile routes downstream, to reduce flow separation and/or minimize oscillating vortex formation and shedding noise, compared to airflow generated by the airfoil without the attachable profile. Minimizing the camber line has the effect of reducing sound amplitude, and also shifting the acoustic frequency up, preferably beyond (above) audible range from audible to inaudible. The purpose of overhang body 40 and curvature 32 is to reduce the discontinuity at the trailing end 2 to avoid a significant increase in the continuity of the lower surface 10 at the rear terminal end 2. By dropping the overhang body 40 as low as or near as low as the bottom surface 10, the discontinuity (defined as the vertical distance from lower surface 10 corner 116 to the lower trailing end corner 132 of wedge. As seen in FIG. 8, the mean camber line 110 will be shifted due to the addition of the profile, but a discontinuity in the mean camber line is relative the discontinuity in the trailing end features. By dropping the overhang body 40 to sync with the lower surface at trailing end, the discontinuity is minimized or eliminated.

Figures 9A, 9B, 9C:
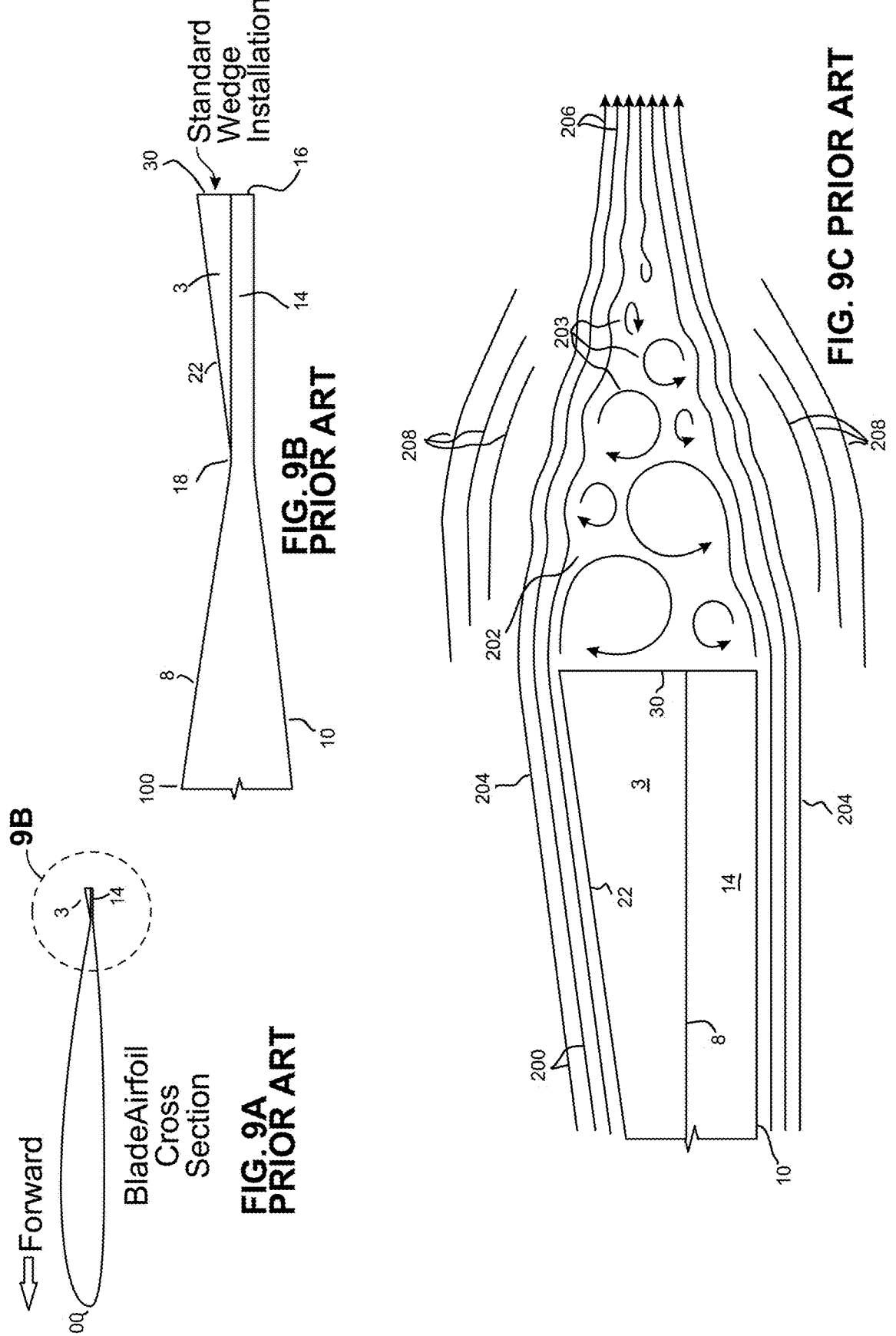
FIG. 9A illustrates a cross-section side view of a rotor blade with profile attached of the prior art.
FIG. 9B illustrates a magnified view of the trailing end along circle 9B of prior art FIG. 9A.
FIG. 9C illustrates a further magnified view of the trailing end of the rotor blade of FIG. 9A including airflow indicators.
Figures 10A, 10B:
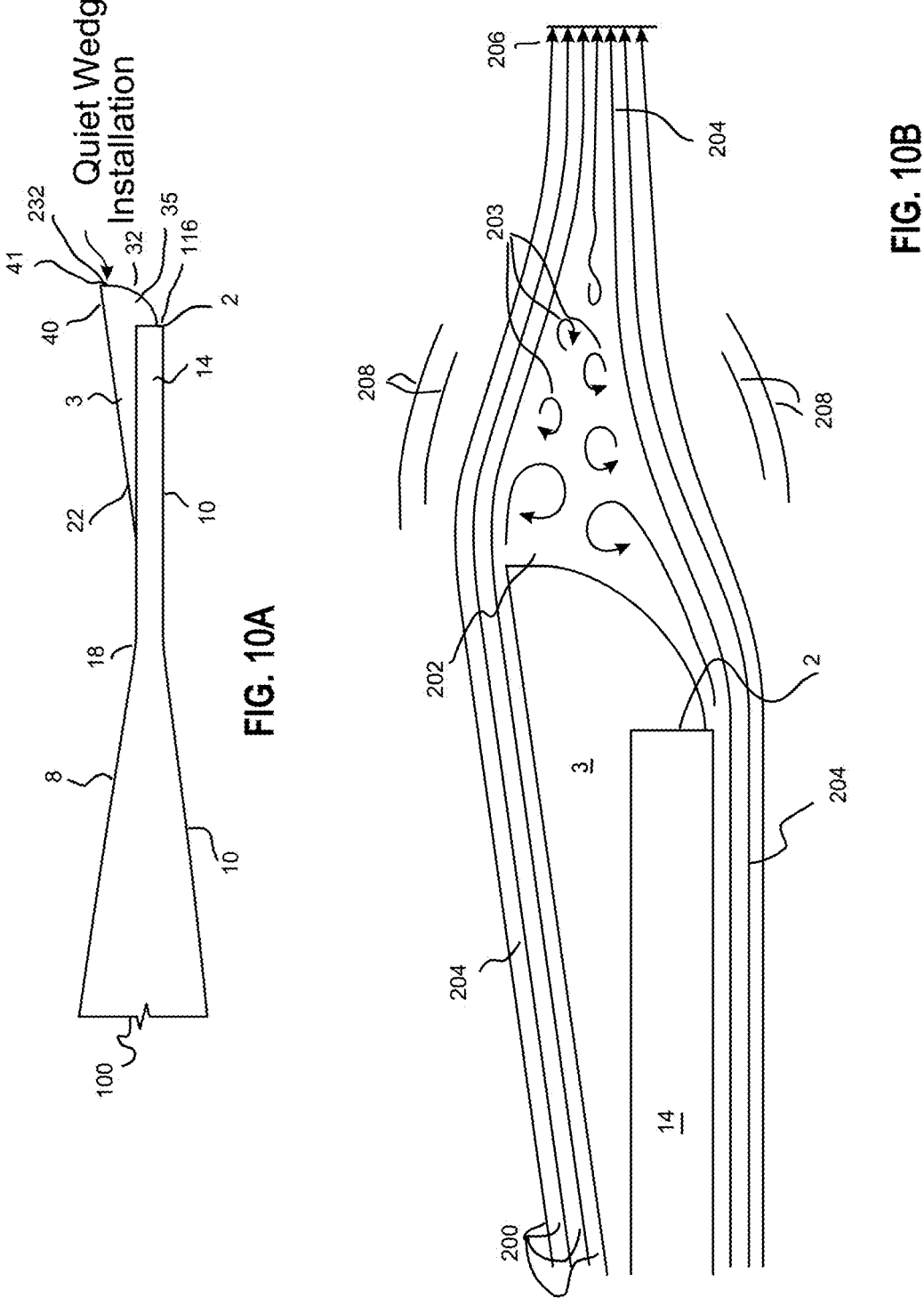
FIG. 10A illustrates a close-up cross-sectional side view of the trailing end of a rotor blade with a profile embodiment of the present invention applied thereon.
FIG. 10B illustrates a further magnified cross-sectional side view of the trailing end of a rotor blade with a profile embodiment of the present invention applied including airflow indicators.

As shown in FIGS. 9A-C, and 10A and 10B, standard wedge installation (FIG. 9) compares to quiet wedge installation (shown below FIG. 10) for profiles in aerodynamic airflow. As shown in FIG. 9A, side cross-sectional view of rotor blade 100 is shown with profile 3 adhered over tab 14. As seen in magnified end, FIG. 9B, trailing side 30 aligns with trailing end 2 of rotor blade. As can be seen, airflow lines 200 demonstrate the flow of air as rotor blade is engaged and rotated to provide lift to helicopter. Cambering along upper surface of rotor blade causes fast airflow over top side 22 of profile. As airflow 200 extends over top side 22 of profile, resonance zone 202 is shown immediately behind trailing end of wedge and rotor blade with aerodynamic vortices 203. Resonance zone 202 forms a zone which is periodically collapsed by pressure waves forming a loud acoustic noise. It is understood that the size of the resonance zone is related to the volume of acoustic disruption. Minimizing draft resonance stagnant zones has been shown to minimize acoustic disturbance at trailing end of rotor blade. Resonance zone may be determined based on overall blade and wedge configuration and wedge may be shaped to extend in trailing direction (of blade) to encompass to fill such zones. As can be seen in FIGS. 10A and 10B, quiet wedge installation includes profile 3 set along upper surface 8 and trailing end 2 of rotor blade 100 (or tab 14). Trailing curvature 32 forms an arc 32 allowing airflow 204 to speed up along lower surface 10 and trailing curvature 32 to minimize resonance zone 202, and size of vortices 203. Airflow continues in unison past trailing end 206. As shown, the size of vortices 203 is markedly smaller leading to less turbulence and a smaller overall resonance zone 202. Radiation waves 208 are produced above and below wake carry acoustic noise from trailing edge. Notably, the sound radiation waves 208 are reduced with a profile of an embodiment of the present invention shown in FIG. 10B as opposed to the prior art of FIG. 9C.

Figure 11:
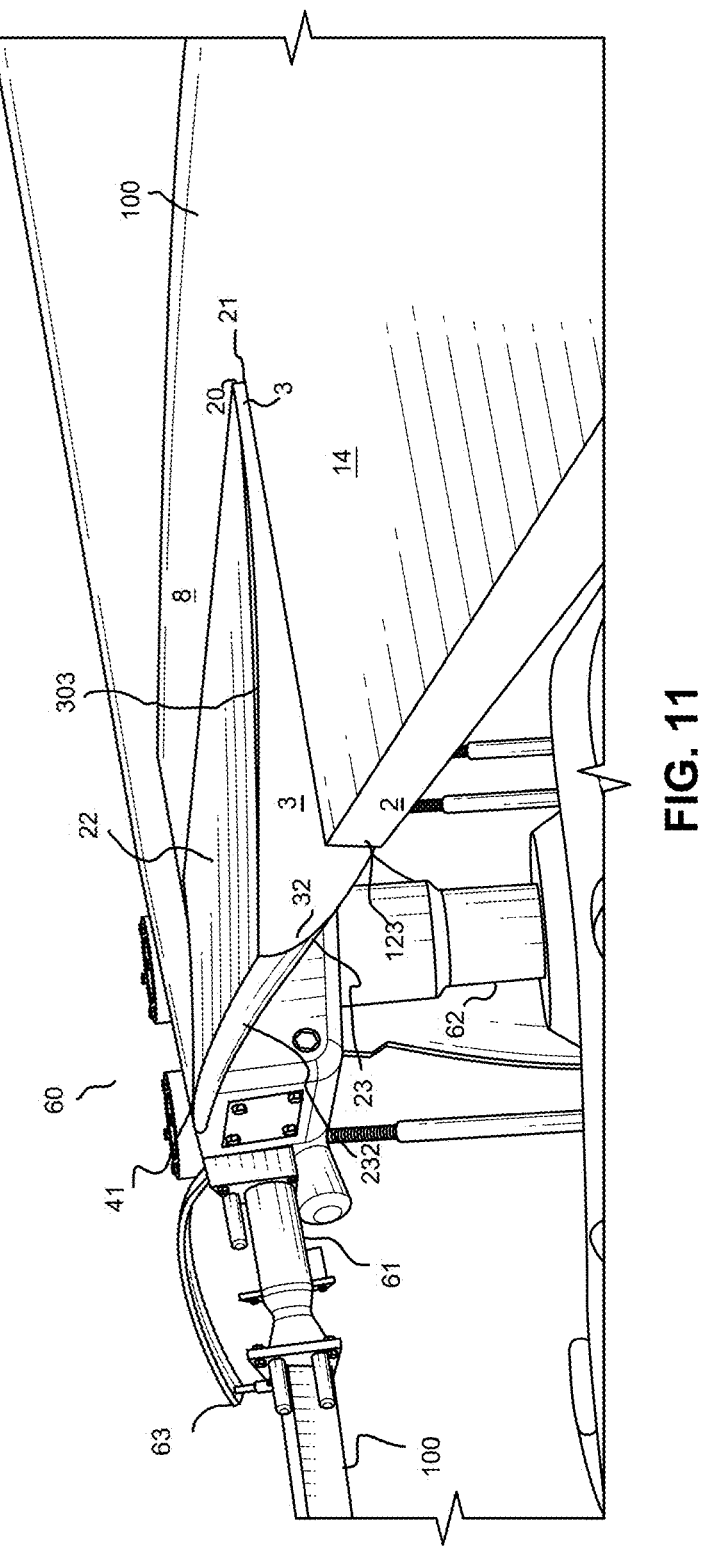
FIG. 11 illustrates a perspective close-up field view of the trailing end of a rotor blade with a profile embodiment of the present invention attached.

FIG. 11 demonstrates profile 3 set upon rotor blade upper surface 8 and trailing end 2. Rotor head 60 is supported by rotor mast 62. Blades 100 are attached (commonly by lugs) to rotor arms 61 via blade grip 63. On blade 100, leading side 21 of profile 3 sets in the leading-side direction at leading corner 20. Profile 3 is set upon trailing tab 14. Profile trailing corner 41 sits slightly above leading corner 20, with trailing curvature 32 running down to rotor trailing end 2 with a height 23 extending down just a bit less than the full height 123 of the trailing end 2.

The presently disclosed subject matter is not limited to any particular helicopter/rotor blade configuration, as the presently disclosed subject matter may be used in a variety of applications. The term "rotor blade" may be used in particular, but should be understood to generally refer to airfoils. Rotor blades are unique in that they rotate with a modified air speed in span-wise direction, but in the cross-section review, should not be understood as differing from airfoil. For rotor blades, in particular, a profile with span-wise modifications in the profile shape are contemplated. Airflow is routed over an outer surface of a tracking wedge and other shown profiles. Movement of the airflow moving over a surface of the profile is modified in a suitable path to reduce noise using an acoustic management shape. Acoustic management shapes may be configured to reduce an amount of disturbance placed on the air moving over the surface of the profile. In some examples, an acoustic management shape comprises less than straight top side dimensions, such as concave or convex shapes of the profile, and/or extending chord width. Also, the terms "vertical" and "horizontal" are used to illustrate the invention and particular to illuminate the drawings. However in practice, such dimensions are not necessarily vertical (or horizontal) and should not be read as so limiting, whether the blade attack angle is rotated (off of vertical) or the trailing end of the blade is not a straight vertical. Additionally, the use of a trailing tab may be optional, and the profile may be attached to a rotor blade trailing end with or without a trailing tab on the blade. The present invention is useful on multiple aircraft, and would not be read as limited to helicopter, but can be read for any rotor craft vehicle in which lift and thrust are supplied by horizontally spinning rotors, with allowance for controlled modification of attack angle to provide motion to the vehicle. The profiles may be adhered to the top or bottom surfaces of a blade/tab, and no distinction should be determined preferable based on this disclosure. The illustrations of the profile on the top surface are not meant to be to the exclusion of application to the under- or bottom side of the rotor, and placement on top or bottom are both preferred and intended to be disclosed herein.

While various embodiments of the present invention have been described, the invention may be modified and adapted to various operational methods to those skilled in the art. The term wedge is not meant to be limiting, and refers to blade tracking devices as are commonly referred to as "wedges" in the art, regardless of "wedge-type" shape. Profiles are generally referred to as "wedges" but the shape of the profile(s) is not limited to wedges as are known in the art. Certain angles and geometries of the wedge are provided for illustrative purposes, and should set the general idea of the relative sizes of angle, if not the range of potential angle sizes. Similarly, while only demonstrated on the upper side of the blade/tab, the profiles may be installed under the lower surface of the blade/tab. Therefore, this invention is not limited to the description and figure shown herein, and includes all such embodiments, changes, and modifications that are encompassed by the scope of the claims.

I claim:

1. An attachable profile useful for reducing airframe vibration, and improving blade tracking and acoustic properties of an operating airfoil comprising:
   a) a profile adhered to an upper surface of an airfoil to modify the mean camber line upwards, said profile covering an airfoil top trailing corner;
   b) wherein said profile includes a flat top extending between a front leading corner to a rear top corner, said profile extending rearward of an airfoil trailing end of the airfoil extending the effective chord length of the airfoil;
   c) wherein said profile includes an overhang portion extending downwards below the airfoil upper surface towards a blade trailing end lower corner, wherein said overhang portion covers at least a portion of an airfoil rear edge of the airfoil trailing end;
   d) wherein said profile comprises a rear extending from a top rear end corner to a lower trailing end corner, the lower trailing end corner set adjacent to an airfoil trailing tab trailing end, said lower trailing end corner set directly rear of the airfoil trailing tab trailing end.

2. The attachable profile set forth in claim 1 wherein said profile overhang portion extends downwards from the airfoil top trailing corner at least half of a height of the airfoil trailing end.

3. The attachable profile set forth in claim 1 wherein said profile overhang portion extends downwards from the airfoil top trailing corner at least 80% of a height of the airfoil trailing end.

4. The attachable profile set forth in claim 1 wherein said profile overhang portion extends downwards from the airfoil top trailing corner at least 90% of a height of the airfoil trailing end.

5. The attachable profile set forth in claim 1 wherein said profile overhang portion extends downwards from the airfoil top trailing corner completely covering a height of the airfoil trailing end.

6. The attachable profile set forth in claim 1 wherein said profile overhang portion extends downwards from the airfoil top trailing corner and does not extend below a lower surface of the airfoil trailing end.

7. The attachable profile set forth in claim 1 wherein said profile overhang portion comprises a convex body.

8. The attachable profile set forth in claim 7 wherein said convex body defines an arc extending from the top rear end corner to the lower trailing end corner.

9. The attachable profile set forth in claim 8 wherein said lower trailing end corner is adjacent the airfoil trailing end.

10. The attachable profile set forth in claim 1 wherein said attachable profile tapers in thickness growing from a thin leading edge rearwards to create a ramp configuration.

11. An attachable profile useful for reducing airframe vibration, and improving blade tracking and acoustic properties of an operating airfoil comprising:
   a) a profile adhered to a lower surface of an airfoil to modify the mean camber line downwards, said profile covering an airfoil lower trailing corner;
   b) wherein said profile includes a flat bottom extending between a front leading corner to a rear bottom corner, said profile extending rearward of an airfoil trailing end of the airfoil extending the effective chord length of the airfoil;

c) wherein said profile includes an overhang portion extending downwards below the airfoil lower surface towards a blade trailing end lower corner, wherein said overhang portion covers at least a portion of an airfoil rear edge of the airfoil trailing end;

d) wherein said profile comprises a rear extending from a lower rear end corner to an upper trailing end corner, the upper trailing end corner set adjacent to an airfoil trailing tab trailing end, said upper trailing end corner set directly rear of the airfoil trailing tab trailing end.

12. The attachable profile set forth in claim 11 wherein said profile overhang portion extends upwards from the airfoil lower trailing corner at least half of a height of the airfoil trailing end.

13. The attachable profile set forth in claim 11 wherein said profile overhang portion extends upwards from the airfoil lower trailing corner at least 80% of a height of the airfoil trailing end.

14. The attachable profile set forth in claim 11 wherein said profile overhang portion extends upwards from the airfoil lower trailing corner at least 90% of a height of the airfoil trailing end.

15. The attachable profile set forth in claim 11 wherein said profile overhang portion extends upwards from the airfoil lower trailing corner completely covering a height of the airfoil trailing end.

16. The attachable profile set forth in claim 11 wherein said profile overhang portion extends upwards from the airfoil lower trailing corner and does not extend above an upper surface of the airfoil trailing end.

17. The attachable profile set forth in claim 11 wherein said profile overhang portion comprises a convex body.

18. The attachable profile set forth in claim 17 wherein said convex body defines an arc extending from the lower rear end corner to the upper trailing end corner.

19. The attachable profile set forth in claim 18 wherein said upper trailing end corner is adjacent the airfoil trailing end.

20. The attachable profile set forth in claim 11 wherein said attachable profile tapers in thickness growing from a thin leading edge rearwards to create a ramp configuration.

* * * * *